United States Patent Office 3,595,935
Patented July 27, 1971

3,595,935
POLYBLENDS HAVING IMPROVED PROPERTIES
Lamberto Crescentini, Chester, Va., assignor to Allied Chemical Corporation, New York, N.Y.
No Drawing. Filed Jan. 31, 1969, Ser. No. 795,691
Int. Cl. C08g *41/04*
U.S. Cl. 260—857R                    9 Claims

ABSTRACT OF THE DISCLOSURE

When polyamides having a substantial proportion of primary amino end-groups and carboxyl end-groups bound to terminating agents containing tertiary or unreactive secondary amino groups are melt-blended with polyesters, filaments can be spun therefrom without adverse interaction between the polymers and with enhanced dyeability.

BACKGROUND OF THE INVENTION

This invention relates to polyester dispersions in polyamides, and to filaments produced therefrom. More particularly, it relates to polyester dispersions in polyamides, commonly called polyblends, wherein polyamide end-groups are terminated for the dual purpose of eliminating polymer interaction and enhancing acid-dyeability of the resultant polyblend.

It is known that filaments of poor quality are usually obtained from dispersions of polyesters in polyamides if the number of primary amino end-groups exceed about 40% of the total end-group concentration in the polyamide. When the primary amino end-group concentration does exceed about 40%, particulate matter forms in the polyblend as a result of copolymer interactions causing stress weakness in filaments spun therefrom. One method for obviating this problem is discussed in U.S. Pat. 3,369,-057 to Twilley, which teaches the use of non-nitrogen bearing mono- and dicarboxylic acids as "terminators" to reduce the concentration of polyamide primary amino end-groups. However, filaments spun from such acid-terminated polyamides or dispersions of polyesters in such polyamides in accordance with Twilley are relatively unreceptive to acid dyes because of the low amino end-group concentration.

Stress weakness in polyblend filaments containing relatively high primary amino end-group concentrations is also caused by degradation of the polymeric structure upon exposure to light. Filament yarns and cords made from polyblends are extremely useful in the manufacture of elastomeric tires, conveyor belts, seat belts, hoses, carpets, apparel and the like. In some instances the yarns must possess high strength and for other uses good dyeing properties are preferred. With the foregoing in mind it is an object of the present invention to provide polyblends that resist molecular degradation when exposed to light and exhibit high receptivity toward acid dyes.

It is a further object of the present invention to provide chain terminated polyamides suitable for melt-blending with polyesters.

It is another object of the present invention to provide polyamides containing polyester dispersions therein which can be spun into filaments without adverse interaction between the polymers.

These and other objects will become more apparent on reading the following detailed disclosure.

SUMMARY OF THE INVENTION

It has now been found that polyamides can be prepared which are melt-blendable with polyesters without chemically reacting therewith and which have enhanced, acid-dyeable characteristics. In one aspect of the present invention polyamides are produced which are bilaterally terminated. Bilateral termination refers to the existence of terminating agents at both polymer chain ends.

According to the above aspect of this invention, the concentration of primary amino end-groups is effectively reduced without impairing the receptivity of the polyamide toward acid dyes. Polyblends derived from these bilaterally terminated polyamides exhibit enhanced receptivity toward acid dyes, since the terminating agents contain amino dye-sites which are unreactive towards the polyester.

Polyamides useful in the practice of the instant invention are usually prepared by the self-polymerization of a monoamino-monocarboxylic acid or the corresponding lactam or by heating a diamine with a dibasic carboxylic acid until the product has polymerized to a fiber-forming stage.

More specifically, polyamides which are readily acid-dyeable and which can be blended with polyesters in the molten state and thereafter spun into filaments are produced according to the instant invention by having a substantial proportion of the polyamide end-groups bound to an amino-terminating moiety, i.e., a moiety which terminates amino ends of the polyamide chain, which terminating moiety is chemically inert with respect to the polyester and contains a secondary or tertiary amino group. In addition, the bilateral terminating system is a bicomponent system, such as a monocarboxylic acid and a monoprimary amine or a dicarboxylic acid and a monoprimary amine or a diprimary amine and a monocarboxyilc acid, in which event a substantial number of polyamide carboxyl end-groups are also terminated to increase the number of available dye-sites. In such a bicomponent system, the dicarboxylic acid may be thought of as an amino-terminating moiety within the context of this invention.

DESCRIPTION OF THE PREFERRED EMBODIMENTS

Chain terminators of use in the instant invention for terminating the primary amino end-groups of a polyamide include any compounds which satisfy the following requirements: terminating capacity, i.e., it must react with the amino end of a polyamide chain to block further propagation of the chain; and substantial chemical inertness with respect to polyesters to avoid polymer interaction. Among the effective terminating moieties are those having the general formula

(I)

where Q is an organic monovalent radical selected from the group consisting of normal or branched aliphatic radicals containing 1 to 30 carbon atoms, aromatic radicals containing 6 to 20 carbon atoms and aralkyl radicals containing up to 20 carbon atoms.

The more preferred amino-terminating moieties of Formula I are further characterized in that they contain a tertiary or unreactive secondary amino group and have the formula

(IA)

wherein:

R is a divalent organic group containing up to about 20 carbon atoms;

A is selected from the group consisting of hydrogen, aliphatic, alicyclic, aromatic and heterocyclic substituents containing up to about 20 carbon atoms, said heterocyclic substituent containing a heteroatom selected from the group consisting of oxygen, sulfur and tertiary nitrogen;

B is selected from the group consisting of aliphatic, alicyclic, aromatic and heterocyclic substituents containing up to about 20 carbon atoms, said heterocyclic substituent containing a heteroatom selected from the group consisting of oxygen, sulfur, and tertiary nitrogen; and A, B, and N, taken together, form a nitrogen heterocycle containing up to 2 additional heteroatoms each selected from the group consisting of oxygen, sulfur and tertiary nitrogen.

In accordance with the instant invention it is further necessary to terminate not only the primary amino endgroups, in the manner already described, but also the carboxyl end-groups of the polyamide with terminators containing unreactive but relatively basic moieties. Thus, not only is the concentration of primary amino end-groups effectively reduced, but also, the overall basicity of the polyamide is substantially retained or increased, together with the receptivity thereof toward acid dyes.

More particularly, such polyamides are produced according to the present invention by joining a substantial proportion of the primary amino end-groups of the polyamide to substituents of the type having a formula denoted by structure I above, and also replacing a substantial proportion of the hydroxyl moieties of the carboxyl end-groups by a substituent having the formula

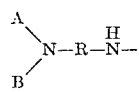

II wherein:

R is a divalent organic group containing up to about 20 carbon atoms;

A is selected from the group consisting of hydrogen, aliphatic, alicyclic, aromatic and heterocyclic substituents containing up to about 20 carbon atoms, said heterocyclic substituent containing a heteroatom selected from the group consisting of oxygen, sulfur and tertiary nitrogen;

B is selected from the group consisting of aliphatic, alicyclic, aromatic and heterocyclic substituents containing up to about 20 carbon atoms, said heterocyclic substituents containing a heteroatom selected from the group consisting of oxygen, sulfur and tertiary nitrogen; and A, B and N, taken together, form a nitrogen heterocycle containing up to 2 additional heteroatoms each selected from the group consisting of oxygen, sulfur and tertiary nitrogen.

Examples of suitable amino-terminating moieties of Formula I include:

acetyl-
lauroyl-
benzoyl-

The most preferred amino-terminating moieties are those of Formula IA wherein R is alkylene, A is hydrogen or alkyl, B is alkyl or cycloalkyl; A and B, taken together, form a nitrogen heterocycle containing up to 2 additional heteroatoms selected from the group consisting of oxygen, sulfur or tertiary nitrogen. Specific preferred moieties include the following:

α=(N,N-dimethylamino)acetyl-
α=(N,N-diethylamino)acetyl-
β=(N-cyclohexylamino)propionyl-
N=pyrrolidylacetyl-
α=(N-piperidyl)acetyl-
N=morpholinylacetyl-
α=(N-pyrrolidyl)propionyl- Suitable compounds for introduction of the above-listed preferred amino-terminating moieties may be prepared, respectively, as described in:

Journal of the Chemical Society, 1950, 1342–5;
Journal of Pharmacy and Pharmacology, 16 (9) 618–26 (1964);
Journal of the American Chemical Society, 75 3413–17 (1953);
Journal of the American Chemical Society, 83 3323–7 (1961);
Acta Universitatis Szegediensis, Acta Physica et Chemica, 5 No. 1–2, 43–6 (1959);
Journal of Organic Chemistry, 26 779–82 (1961);
Organic Syntheses, Coll. vol. IV, p. 466.

Examples of substituents having the general Formula II and which are therefore suitable for use according to the present invention include substituents analogous to those mentioned above in connection with Formula IA wherein the carbonyl moiety is replaced by a methylamino moiety. Substituents having the general Formula II which are preferred for use according to the present invention are:

γ-(N,N-dimethylamino)propylamino-
γ-(N,N-diethylamino)propylamino-
γ-(N-cyclohexylamino)propylamino-
γ-(N-morpholinyl)propylamino-
γ-(N-pyrrolidyl)propylamino-
β-(N-piperidyl)ethylamino-
β-(N-morpholinyl)ethylamino- Suitable compounds for introduction of the above-listed carboxyl-terminating moieties may be prepared, respectively, as described in:

U.S. Pat. 2,459,088;
Journal of the American Chemical Society, 76 2414–17 (1954);
Journal of the American Chemical Society, 72 341–3 (1950);
Yakugoku Zasshi, 81 149–50 (1961);
Annalen der Chemie, 596 158–224 (1955);
Doklady Akademii Nauk SSSR, 59 489–92 (1948);
Journal of the American Chemical Society, 62 447–8 (1940).

The amino-terminating moieties can be introduced into the polyamide by means of any suitable derivatives which will afford the desired moiety. For example, moieties of Formula IA can be introduced in the form of aminoacids of Formula III or the corresponding ester of Formula IV,

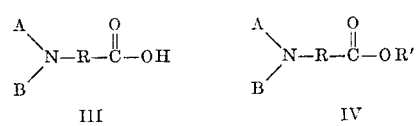

III                    IV wherein A, B, and R are as aforesaid and R' is alkyl. Use of the lower alkyl esters of Formula IV is preferred unless volatilization thereof during the polymerization reaction makes the acid more suitable. Other amide-forming derivatives which might be employed include acid anhydrides, acid halides, etc.

Alternatively, the amino-terminating moiety can be a bifunctional acid or suitable derivative thereof with the general formula

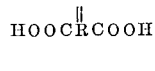

in which

is a divalent hydrocarbon radical having a chain length of at least 2 carbon atoms. Examples of suitable bifunctional acids are 1,4-butanedicarboxylic acid, decanedioic acid, octanedioic acid, nonanedioic acid and phenylene diacetic acid. In addition,

R can contain tertiary nitrogen substituents, for example, when piperazino-1,4-diacetic acid is the amino-terminating moiety.

Similarly, the carboxyl-terminating moiety can be a diprimary amine or suitable derivative thereof with the general formula H₂NR'''NH₂ in which R''' is a divalent hydrocarbon radical having a chain length of at least 2 carbon atoms. Examples of suitable diprimary amines are hexamethylene diamine and m-xylene diamine. In addition R''' can contain tertiary nitrogen substituents, for example, such as methylimino bis propylamine and N,N'-bis (amino propyl) piperazine.

The bilateral-terminating moieties can be introduced into the polyamide by means of any suitable derivative which will afford the desired moiety. For example, a moiety of Formula II is introduced into the polyamide with a moiety of Formula I. The moieties of Formula I can be introduced in the form of aminoacids or their corresponding esters, as set forth above. Alternatively, the moieties may be admixed prior to injection into the polyamide material; thereafter being introduced into said material in the form of amides or salts of the corresponding moieties.

More specifically, the bilateral terminator systems of the instant invention are comprised of a carboxylic acid or the corresponding esters thereof and a monoprimary amine, employed in a 1:1 molar ratio; a dicarboxylic acid or the corresponding ester thereof and a monoprimary amine, employed in a 1:2 molar ratio; or a carboxylic acid or the corresponding ester thereof and a diprimary amine, employed in a 2:1 molar ratio.

Specific examples of bilateral terminator systems include:

Ethyl N-piperidylacetate and $\gamma$-(N-piperidyl)trimethylene amine, employed in a 1:1 molar ratio;

Decanedioic acid and $\gamma$-(N-morpholinyl)trimethylene amine, employed in a 1:2 molar ratio;

(N,N'-dicarbethoxymethyl)piperazine and $\gamma$-(N-morpholinyl)trimethylene amine, employed in a 1:2 molar ratio; and Hexamethylene diamine and ethyl $\alpha$-(N-piperidyl)acetate employed in a 1:2 molar ratio.

The above mole ratios are those necessary to obtain complete termination, however, other ratios resulting in partial termination may be desirable in some instances, for example, where diprimary amines or dicarboxylic acids are employed as components in the bilateral system. For example when the bilateral terminating system is comprised of 1 mole of decanedioic acid and 1.5 moles of $\gamma$-(N-morpholinyl)trimethyleneamine, up to .5 mole of a moiety such as octyl amine, hexadecyl amine or benzylamine can be employed as a neutral terminator. Similarly, when the bilateral terminating system is comprised of 1 mole of hexamethylene diamine and 1.5 moles of ethyl $\alpha$-(N-piperidyl)acetate, up to .5 mole of a moiety such as acetic acid, lauric acid, or benzoic acid can be employed as a neutral terminator.

The terminating moieties of the present invention can be incorporated in the polyamide during the polymerization reaction i.e. by adding the terminator system directly to the reaction medium, or after polymerization is complete, by dry-blending the material with the polyamide before producing the filament. In the event that polyester microfibers are to be dispersed in the polyamide, terminating moieties should be incorporated prior to forming the dispersion so as to avoid polymer interaction.

In order to obtain polyamides that do not interact with dispersed polyester, it is necessary that a substantial proportion of the primary amino end-groups be bound to terminating moieties. Specifically, it is desirable that not more than about 40% of end-groups of the polyamide be unbound primary amino groups. Inasmuch as the minimum reduced viscosity of the polyamides employed in the polyamide-polyester dispersions is about 0.9, corresponding to number average molecular weight of about 15,000, these polyesters will have total end-group concentration of about 135 milliequivalents per kilogram of polyamide. Thus, the maximum of about 40% unbound primary amino groups in the instant invention corresponds to about 55 meq./kg. Preferably, the concentration of primary amino groups in the product will be less than about 40 milliequivalents per kilogram of polyamide and more preferably less than about 20 meq./kg. Most preferably, the amino end-group concentration will be less than about 10 meq./kg.

The improvement of the instant invention is most advantageously employed in conjunction with poly $\epsilon$-caproamide and polyester dispersions therein where the polyester has recurring ester linkages and recurring cycle structure in the main polyester chain, for example, polyethylene terephthalate. Other suitable polyesters include polyethylene 2,6 napthalene dicarboxylate, polyethylene 2,7 naphthalene dicarboxylate, polyethylene isophthalate and polyethylene 5-t-butylisophthalate. The polyamide is produced by general procedures well known in the art, for example, by the procedure of charging a reactor vessel with caprolactam, thereafter heating to form a melt and subsequently admixing amino caproic acid with the melt. The amino-terminating moiety is introduced either during of after the polymerization. The polyester dispersion and filaments made therefrom are also produced according to general procedures well known in the art. For example, aforesaid U.S. Pat. 3,369,057 discloses in great detail a method for producing the polyamide-polyester dispersions and filaments made therefrom. Various ingredients may be incorporated into the polymer components either prior to or during the blending operation, said ingredients including: stabilizing agents such as manganese compounds, copper compounds and hindered phenols which protect the polymer against adverse effects of heat, aging, oxidation, and light; reinforcing particles such as silica, and carbon black; adhesion-promoting agents; fluorescent materials; delustering agents such as titanium dioxide and dispersing agents to facilitate and maintain dispersion of the polyester particles.

Filaments produced from the instant terminated poly-$\epsilon$-caproamide-polyethylene terephthalate dispersions according to methods taught by aforesaid U.S. Pat. 3,369,057 exhibited excellent receptivity to acid dyes such as Orange III, Alizarin Milling Blue R, and the like, thereby achieving greater usefulness than polyamide-polyester dispersions available heretofore.

The following examples are provided to more fully illustrate the instant invention. They are provided for illustrative purposes only and are not to be construed as limiting the invention, which is defined by the appended claims.

EXAMPLE I

A mixture of 1520 g. of $\epsilon$-caprolactam, 80 g. of $\epsilon$-aminocaproic acid, 9.65 g. of sebacic acid and 13.8 g. of $\gamma$-aminopropylmorpholine was polymerized for 12 hours at 255° C. The resulting polyamide was then extruded, pelletized, washed with hot water and dried. The relative viscosity of a 10% formic acid solution of this polyamide was 39; carboxyl end-group analysis: 28 meq./kg.; amino end-group analysis: 81 meq./kg. (reflecting the presence of tertiary amines in the chain end-groups.)

This polyamide was blended with pellets of polyethylene terephthalate having a reduced o-chlorophenol viscosity (0.5% solution) of about 0.73, to produce a viscosity stable 70/30 blend which was then spun as a multifilament. A control polyblend multifilament was similarly prepared wherein the polyamide was terminated with sebacic acid, rather than with aminopropylmorpholine as well as sebacic acid, and had a formic acid viscosity of 39. Samples of the two fibers were dyed together in a bath at pH 7.2 containing 0.5% by weight (based on the fibers) of Sulfonine Acid Blue R (Color Index Acid Blue 92). Dispersing agent Triton X–100 (Rohm & Haas) was added in the amount of about 1% based on fiber weight. Over a period of 45 minutes, the temperature of the bath was raised from 100° F. to 205° F., where it was maintained for an additional hour. The fibre derived from the bilaterally terminated polyamide showed a very deep blue color while the control appeared almost white.

EXAMPLE II

The procedure of Example I was repeated wherein 9.28 g. of N,N' - bis(γ - aminopropyl)piperazine and 17.3 g. of ethyl N-methyl N'-piperazinoacetate were substituted for sebacic acid and aminopropylmorpholine.

The dyed fiber showed a very deep blue color.

EXAMPLE III

The procedure of Example I was repeated wherein 10.8 g. of N - methyl - N'(γ - aminopropyl)piperazine and 12.8 g. of ethyl N-methyl-N'-piperazinoacetate were substituted for sebacic acid and aminopropylmorpholine. The dyed fiber showed a very deep blue color.

Since different embodiments of this invention may be made without departing from the spirit and scope thereof, it is to be understood that we do not limit ourselves to the specific embodiments thereof except as defined in the appended claims.

I claim:

1. In a poly-ε-caproamide filament having repeating carbonamide groups as an integral part of the linear polymeric chain and having dispersed therein about 10–50% by weight of polyester microfibers, said polyester being prepared from an aromatic dicarboxylic acid and an aliphatic glycol, wherein not more than about 40% of the primary amino end groups of said polyamide are unbound primary amino end groups, i.e., at least about 60% of the primary amino end groups of said polyamide are bound to an amino-terminating moiety selected from the group consisting of

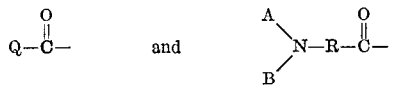

wherein:

Q is a monovalent organic radical selected from the group consisting of normal or branched aliphatic radicals containing 1 to 30 carbon atoms, aromatic radicals containing 6 to 20 carbon atoms and aralkyl radicals containing up to 20 carbon atoms;

R is a divalent organic radical containing up to about 20 carbon atoms;

A is selected from the group consisting of hydrogen, aliphatic, alicyclic aromatic and heterocyclic substituents containing up to about 20 carbon atoms, said heterocyclic substituent containing a heteroatom selected from the group consisting of oxygen, sulfur and tertiary nitrogen;

B is selected from the group consisting of aliphatic, alicyclic, aromatic and heterocyclic substituents containing up to about 20 carbon atoms, said heterocyclic substituent containing a heteroatom selected from the group consisting of oxygen, sulfur and tertiary nitrogen; and A, B and N, taken together, form a nitrogen heterocycle containing up to 2 additional heteroatoms each selected from the group consisting of oxygen, sulfur and tertiary nitrogen, the improvement comprising at least about 50% of the carboxyl end-groups of said poly-ε-caproamide being bound to a terminating moiety of the formula:

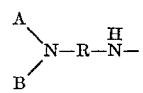

wherein:

R is a divalent organic radical containing up to about 20 carbon atoms;

A is selected from the group consisting of hydrogen, aliphatic, alicyclic, aromatic and heterocyclic substituents containing up to about 20 carbon atoms, said heterocyclic substituent containing a heteroatom selected from the group consisting of oxygen, sulfur and tertiary nitrogen;

B is selected from the group consisting of aliphatic, alicyclic, aromatic and heterocyclic substituents containing up to about 20 carbon atoms, said heterocyclic substituents containing a heteroatom selected from the group consisting of oxygen, sulfur and tertiary nitrogen; and A, B and N, taken together, form a nitrogen heterocycle containing up to 2 additional heteroatoms each selected from the group consisting of oxygen, sulfur and tertiary nitrogen, whereby (1) acid-dyeability of the filament is enhanced and (2) adverse interaction between the polymers is avoided.

2. The improvement of claim 1 wherein the carboxyl end-groups are joined to a substituent having the formula

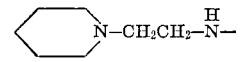

3. The improvement of claim 1 wherein the carboxyl end-groups are joined to a substituent having the formula

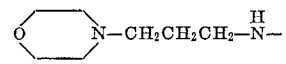

4. The improvement of claim 1 wherein the carboxyl end-groups are joined to a substituent having the formula

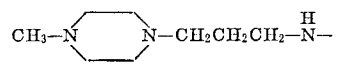

5. In a poly-ε-caproamide filament having repeating carbonamide groups as an integral part of the linear polymeric chain and having dispersed therein about 10–50% by weight of polyester microfibers, said polyester being prepared from an aromatic dicarboxylic acid and an aliphatic glycol, the improvement wherein at least about 60% of said poly-ε-caproamide molecules contain an amino-terminating moiety selected from the group of dicarboxylic acids having a chain length of at least 2 carbon atoms and wherein at least about 50% of the carboxyl end-groups of said poly-ε-caproamide are bound to a terminating moiety of the formula:

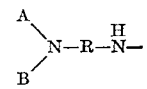

wherein:

R is a divalent organic group containing up to about 20 carbon atoms;

A is selected from the group consisting of hydrogen, aliphatic, alicyclic, aromatic and heterocyclic substituents containing up to about 20 carbon atoms, said heterocyclic substituent containing a heteroatom selected from the group consisting of oxygen, sulfur, and tertiary nitrogen;

B is selected from the group consisting of aliphatic, alicyclic, aromatic and heterocyclic substituents containing up to about 20 carbon atoms, said heterocyclic substituent containing a heteroatom selected from the group consisting of oxygen, sulfur and tertiary nitrogen; and A, B and N, taken together, form a nitrogen heterocycle containing up to 2 additional heteroatoms each selected from the group consisting of oxygen, sulfur and tertiary nitrogen, whereby (1) acid-dyeability of the filament is enhanced and (2) adverse interaction between the polymers is avoided.

6. The improvement of claim 5 wherein the amino-terminating moiety is sebacic acid.

7. The improvement of claim 5 wherein the carboxyl end-groups are joined to a substituent having the formula

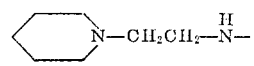

8. The improvement of claim 5 wherein the carboxyl end-groups are joined to a substituent having the formula
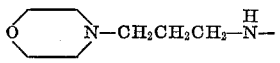
9. The improvement of claim 5 wherein the carboxyl end-groups are joined to a substituent having the formula
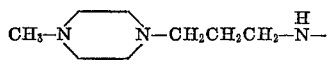
References Cited
UNITED STATES PATENTS
2,174,527  10/1939  Peterson _____ 260—78
3,369,057  2/1968   Twilley _____ 260—857
PAUL LIEBERMAN, Primary Examiner
U.S. Cl. X.R.
260—37N, 40P, 45.95, 75R, 75T, 78R, 78SC